(12) United States Patent
Clary

(10) Patent No.: US 9,282,734 B2
(45) Date of Patent: Mar. 15, 2016

(54) ADJUSTABLE GUN SUPPORT APPARATUS

(71) Applicant: Stanley M Clary, Nichols, SC (US)

(72) Inventor: Stanley M Clary, Nichols, SC (US)

( * ) Notice: Subject to any disclaimer, the term of this patent is extended or adjusted under 35 U.S.C. 154(b) by 0 days.

(21) Appl. No.: 14/276,836

(22) Filed: May 13, 2014

(65) Prior Publication Data

US 2014/0366423 A1 Dec. 18, 2014

Related U.S. Application Data

(60) Provisional application No. 61/822,546, filed on May 13, 2013.

(51) Int. Cl.
*F41A 23/16* (2006.01)
*A01M 31/00* (2006.01)
*F41C 27/22* (2006.01)
*A01M 31/02* (2006.01)

(52) U.S. Cl.
CPC ............. *A01M 31/00* (2013.01); *A01M 31/025* (2013.01); *F41A 23/16* (2013.01); *F41C 27/22* (2013.01)

(58) Field of Classification Search
USPC ......................................... 42/90, 94
See application file for complete search history.

(56) References Cited

U.S. PATENT DOCUMENTS

| | | | | |
|---|---|---|---|---|
| 1,549,051 A | * | 8/1925 | Schreiber | 89/192 |
| 2,436,349 A | * | 2/1948 | Adams | 42/94 |
| 2,807,904 A | * | 10/1957 | Kreske | 42/94 |
| 2,977,703 A | * | 4/1961 | Sarvis | 42/94 |
| 4,937,965 A | | 7/1990 | Narvaez | |
| 4,967,497 A | * | 11/1990 | Yakscoe | 42/94 |
| 5,067,268 A | * | 11/1991 | Ransom | 42/94 |
| 5,347,740 A | * | 9/1994 | Rather et al. | 42/94 |
| 5,481,817 A | | 1/1996 | Parker | |
| 5,491,919 A | | 2/1996 | Rather et al. | |
| 5,628,135 A | * | 5/1997 | Cady | 42/94 |
| 5,833,308 A | * | 11/1998 | Strong et al. | 297/172 |
| 5,974,719 A | * | 11/1999 | Simonek | 42/94 |
| 6,053,282 A | | 4/2000 | Morisak | |
| 6,079,517 A | | 6/2000 | Payne | |
| 6,390,426 B1 | * | 5/2002 | Berry | 248/230.1 |
| 6,663,059 B1 | | 12/2003 | Warren | |
| 6,931,777 B1 | * | 8/2005 | Krien | 42/94 |
| 6,948,587 B2 | | 9/2005 | Griffiths | |
| 7,086,192 B2 | | 8/2006 | Deros | |
| 7,165,750 B2 | | 1/2007 | McCuskey et al. | |
| 7,281,347 B2 | | 10/2007 | Carpenter | |
| 7,406,794 B1 | * | 8/2008 | Pope, Jr. | 42/94 |
| 7,676,976 B2 | * | 3/2010 | Dueck et al. | 42/90 |
| 7,730,824 B1 | * | 6/2010 | Black | 89/37.03 |
| 7,774,972 B2 | * | 8/2010 | Potterfield et al. | 42/94 |
| 8,434,397 B1 | * | 5/2013 | Deckard et al. | 89/37.16 |
| 2004/0020097 A1 | * | 2/2004 | Deros | 42/94 |
| 2004/0134113 A1 | * | 7/2004 | Deros et al. | 42/94 |
| 2005/0183320 A1 | * | 8/2005 | Krien et al. | 42/94 |
| 2008/0283334 A1 | | 11/2008 | Fickey et al. | |
| 2010/0146836 A1 | * | 6/2010 | Moody et al. | 42/72 |
| 2011/0126444 A1 | * | 6/2011 | Keng et al. | 42/94 |
| 2011/0167704 A1 | * | 7/2011 | Chupp | 42/90 |
| 2015/0000172 A1 | * | 1/2015 | Oglesby | 42/90 |

* cited by examiner

*Primary Examiner* — Michael David
(74) *Attorney, Agent, or Firm* — P. Jeff Martin; The Law Firm of P. Jeffrey Martin, LLC

(57) ABSTRACT

An adjustable shooting rail device retrofittable to a conventional hunting stand or hunting blind. The device includes an adjustment mechanism having an actuator that is pivotally secured between a shooting rail and a vertical member of the hunting stand. The device further includes a pair of support collars pivotally coupling the actuator between the shooting rail and the vertical member. A locking means is provided for releasably locking the shooting rail at a selectively-desired vertical position.

8 Claims, 9 Drawing Sheets

ADJUSTABLE GUN SUPPORT APPARATUS

RELATED APPLICATIONS

This application claims priority to U.S. Provisional Patent Application No. 61/822546, filed on May 13, 2013 and entitled, "Adjustable Shooting Rail Device". The entire contents of which are incorporated herein by reference.

BACKGROUND OF THE INVENTION

1. Field of the Invention

The present invention relates generally to hunting equipment, and more particularly, to an adjustable shooting rail apparatus adapted for retrofit to a conventional hunting blind or stand.

2. Description of the Related Art

Currently there exist in the art various weapon support devices and systems for use or integrated with hunting blinds or hunting stands. However, the prior art has failed to disclose or teach an adjustable shooting rail device adapted for retrofit to a conventional hunting stand or hunting blind.

Accordingly, a need exists for an adjustable shooting rail device retrofittable to a conventional hunting blind/hunting stand. The development of the device of the present invention fulfills this need.

A search of the prior art did not disclose any patents that read directly on the claims of the instant invention; however, the following references were considered related:

U.S. Pat. No. 7,086,192 B2, issued in the name of Deros;
U.S. Pat. No. 7,281,347 B2, issued in the name of Carpenter;
U.S. Pat. No. 5,491,919, issued in the name of Rather et al.;
U.S. Pat. No. 4,937,965, issued in the name of Narvaez;
U.S. Pat. No. 5,481,817, issued in the name of Parker;
U.S. Pat. No. 7,165,750 B2, issued in the name of McCuskey et al.;
U.S. Pat. No. 6,079,517, issued in the name of Payne;
U.S. Pat. No. 6,948,587 B2, issued in the name of Griffiths;
U.S. Pat. No. 6,663,059 B1, issued in the name of Warren;
U.S. Pat. No. 6,053,282, issued in the name of Morisak; and
U.S. Patent Application no. 2008/0283334 A1, published in the name of Fickey et al.

Consequently, a need has been felt for an adjustable shooting rail device retrofittable to a conventional hunting blind/hunting stand in a manner which is quick, easy, and efficient.

This application presents claims and embodiments that fulfill a need or needs not yet satisfied by the products, inventions and methods previously or presently available. In particular, the claims and embodiments disclosed herein describe an adjustable shooting rail device, the device comprising: an adjustment mechanism retrofittable to a conventional hunting stand or hunting blind, the mechanism comprising an actuator pivotally secured between a shooting rail and a vertical member of the hunting stand; a pair of support collars pivotally coupling the actuator between the shooting rail and the vertical member; a precision adjuster for allowing the shooting rail to be adjusted longitudinally in precise incremental vertical measures; and a means for releasably locking the shooting rail of the hunting stand at a selectively-desired vertical position, the device of the present invention providing unanticipated and nonobvious combination of features distinguished from the products, inventions and methods preexisting in the art.

The applicant is unaware of any device, apparatus, disclosure or reference that discloses the features of the claims and embodiments disclosed herein.

SUMMARY OF THE INVENTION

Briefly described according to one embodiment of the present invention, an adjustable shooting rail device is disclosed. The adjustable shooting rail device (hereinafter, "device") is adapted and configured to be retrofitted to a conventional hunting blind or hunting stand. The device comprises an adjustment mechanism which includes an actuator pivotally secured between the shooting rail of a conventional hunting stand and a vertical member of a conventional hunting stand. A pair of support collars in the form of cradles pivotally secures the actuator between the shooting rail and vertical member.

The adjustment mechanism is adapted and configured to allow a shooting rail to be pivotally adjustable about a pivot axis in a vertical plane, the pivot axis being defined as a horizontal axis.

The adjustment mechanism further comprises a precision adjuster which allows the shooting rail to be adjusted longitudinally (raised and lowered) in precise incremental vertical measures, in accordance to the operator's selectively-desired shooting rail height.

The adjustment mechanism further provides the unique advantage of allowing the shooting rail to be easily adjusted longitudinally by operator's free hand while concurrently maintaining engagement by operator's other hand on operator's weapon.

A locking means is disclosed for releasably locking the shooting rail at a selectively-desired vertical position. According to one embodiment, the locking means comprises a handle or knob from which a threaded bolt extends downwardly therefrom. Turning of the knob in one direction causes the lower end of threaded bolt to threadedly engage a threaded opening defined through the outer sidewall of the second support collar, and frictionally engage an outer sidewall of shooting rail, thereby securely retaining shooting rail in such position. Turning of the knob in an opposite direction causes disengagement by the locking means from the shooting rail, thereby allowing the support collar to slidably translate about the shooting rail, and in turn facilitating longitudinal adjustment by the shooting rail.

In accordance to one embodiment of the present invention, the actuator comprises a plurality of finger-gripping channels molded integral therein.

In accordance to another embodiment of the present invention, the first support collar comprises a pistol grip design.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

It will be readily understood that the components of the present invention, as generally described and illustrated in the figures herein, may be arranged and designed in a wide variety of different configurations. Thus, the following detailed description of the embodiments as represented in the attached figures, is not intended to limit the scope of the invention as claimed, but is merely representative of selected embodiments of the invention.

Figure 1:
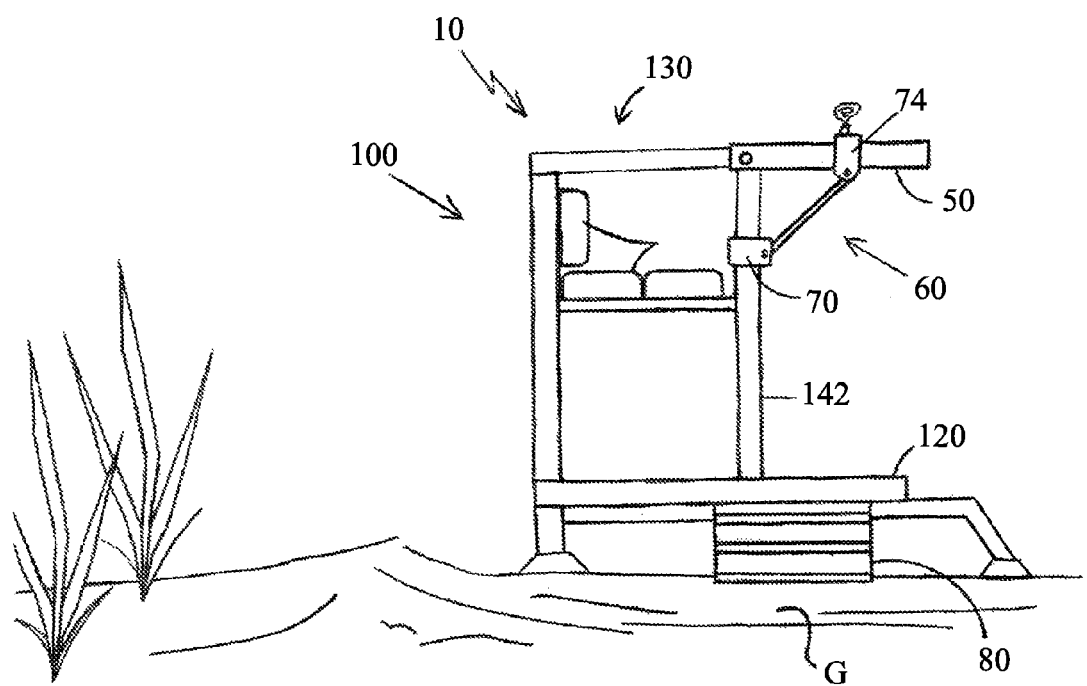
FIG. 1 is a right side elevational view of an adjustable shooting rail device shown retrofitted to a conventional hunting blind, according to one embodiment of the present invention.

Referring now to FIG. 1, an adjustable shooting rail device 10 is disclosed, according to one embodiment of the present invention, wherein the adjustable shooting rail device 10 is shown retrofitted to a conventional hunting blind or hunting stand 100.

Figure 3:
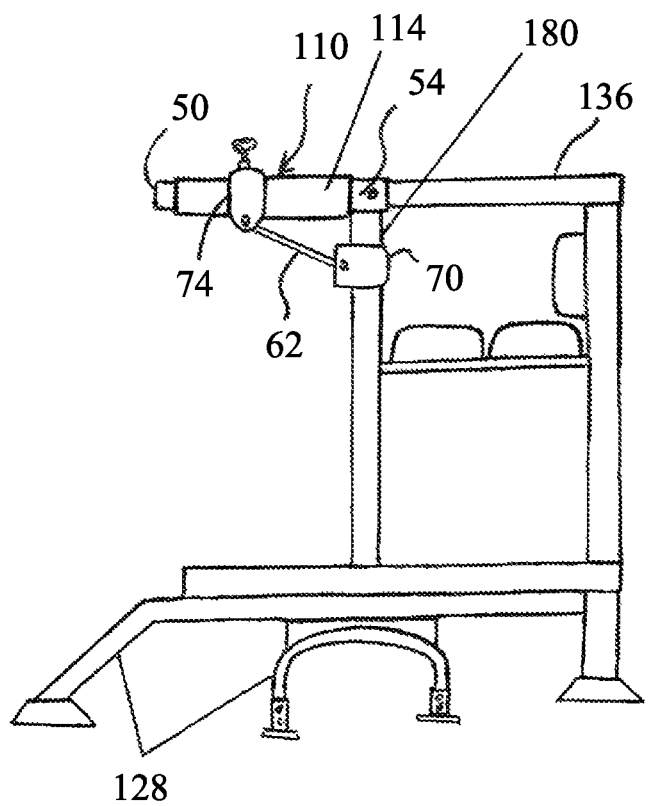
FIG. 3 is a left side elevational view of an adjustable shooting rail device shown retrofitted to a conventional hunting blind, according to one embodiment of the present invention.
Figure 4:
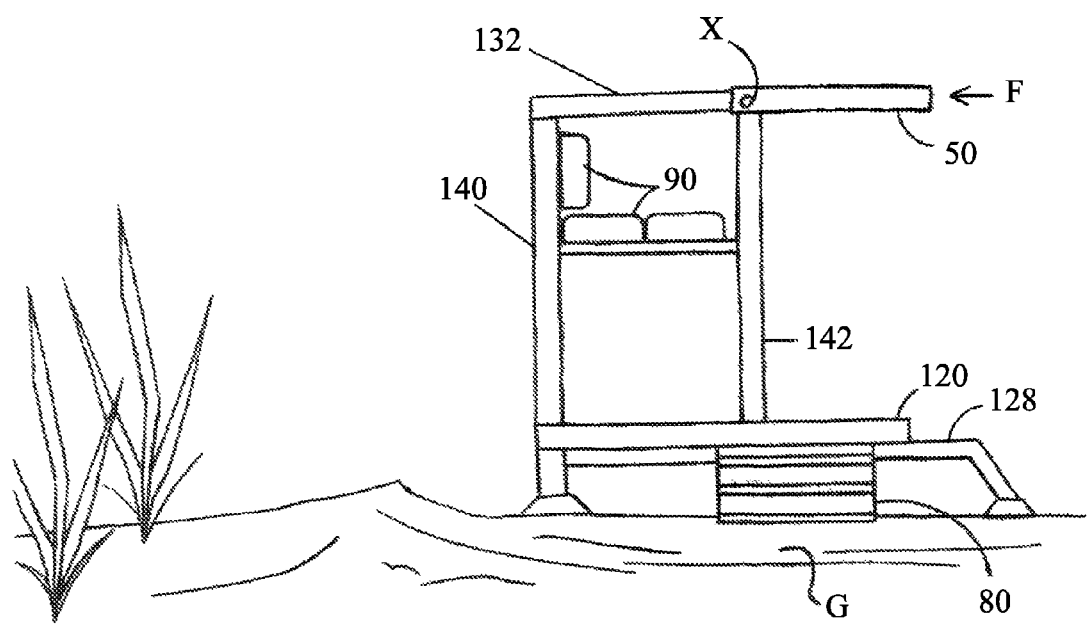
FIG. 4 is a right side elevational view of a conventional hunting blind illustrating the pivot axis about which a shooting rail is pivotally adjustable.
Figure 5:
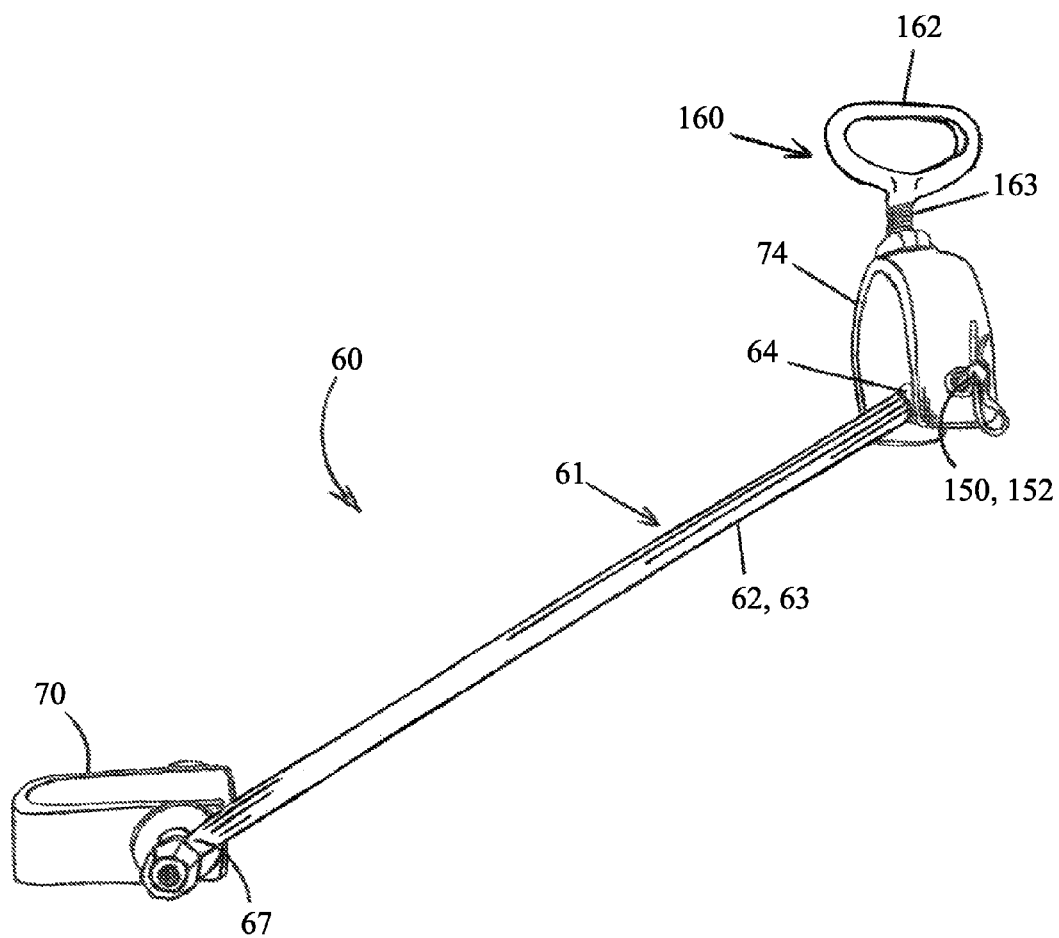
FIG. 5 is a right side perspective view of an adjustment mechanism, according to one embodiment of the present invention.
Figure 5A:
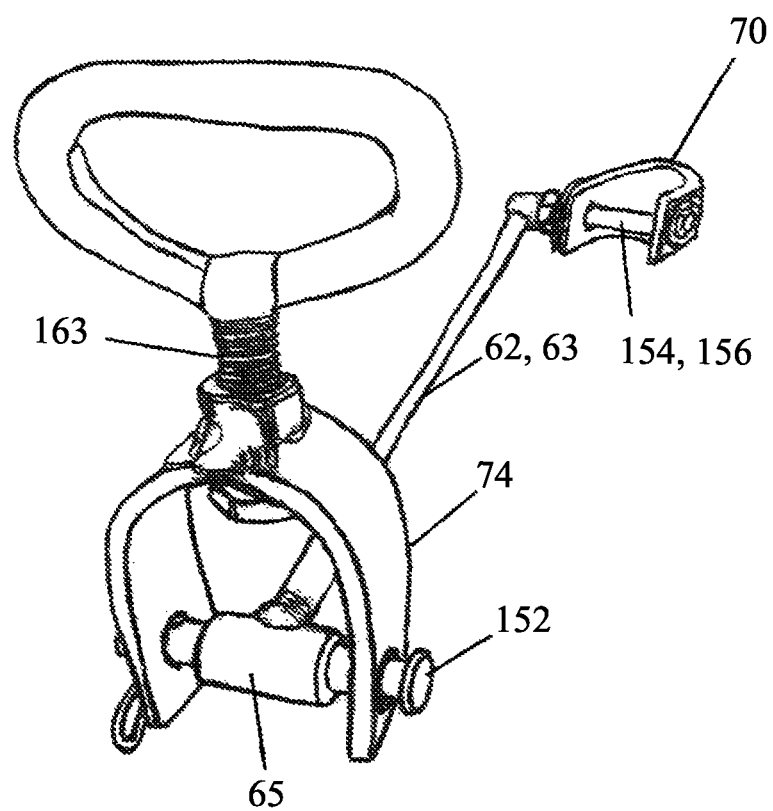
FIG. 5A is a partial front and left perspective view of the adjustment mechanism of FIG. 5.
Figure 5B:
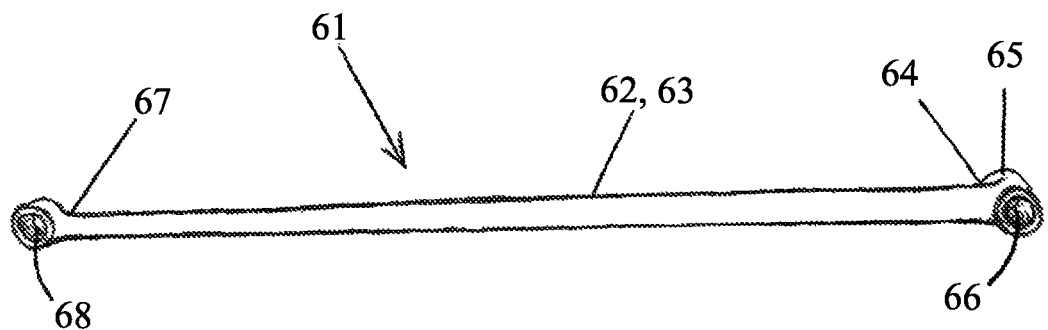
FIG. 5B is a side perspective view of an actuator of the adjustment mechanism; in accordance to one embodiment of the present invention.
Figure 5C:
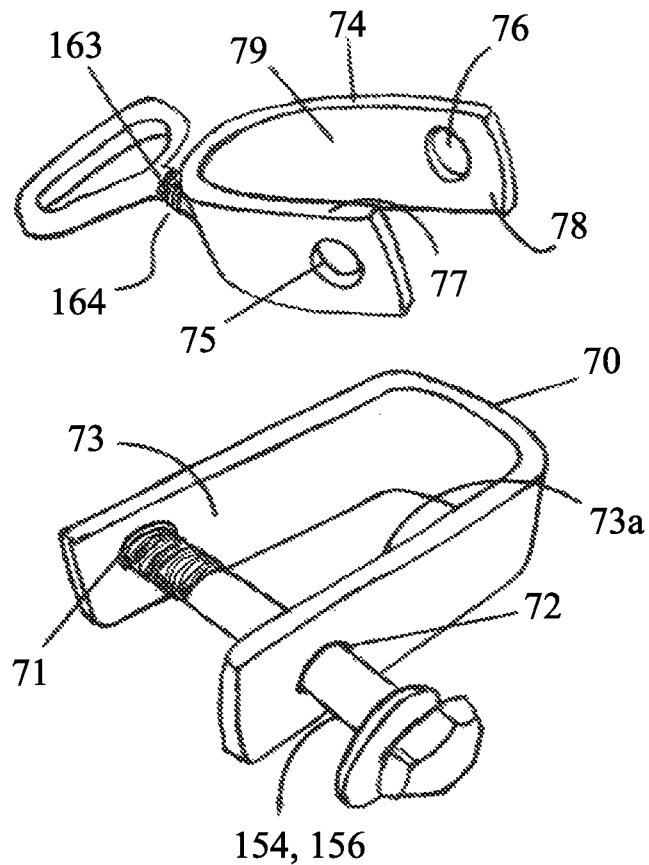
FIG. 5C is a perspective view of a pair of support collars, in accordance to one embodiment of the present invention.
Figure 5D:
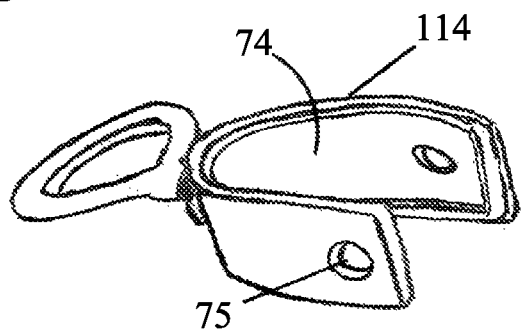
FIG. 5D is a perspective view of a support collar with a liner disposed on the inner surface thereof, in accordance to one embodiment of the present invention.

The representative hunting blind or stand 100, in accordance to one embodiment of the present invention, and as depicted in FIGS. 1, and 3-4, includes, but is not limited to a floor assembly 120 for supporting an upper frame assembly 130, the floor assembly 120 comprises a floor frame 122. The floor frame 122 may be covered with a grated, webbed, or meshed panel 123. The floor frame 122 includes opposed side members 124, 125 having ends securably mounted, such as by arc welding, to ends of end members 126, 127. The floor frame 122 may include at least one crossmember suitably mounted between opposed side members 124, 125 and/or end members 126, 127, the at least one crossmember being positioned below the grated panel 123. The floor frame 122 may be constructed of a strong rigid and durable material, such as tubular steel.

Vertical members 140, 142, 144, and 146 support the upper frame assembly 130 in a vertically, elevated manner above the floor assembly 120. The vertical members 140, 142, 144, and 146, and the upper frame assembly 130 are constructed of a strong rigid material such as tubular metal, or a tubular polymer, wherein metal may be selected from the group which includes steel, titanium, and aluminum.

Lower ends of the first vertical member 140 and the third vertical member 144 are suitably mounted to the rearward portion of the floor assembly 120. Lower ends of the second vertical member 142 and the fourth vertical member 146 are suitably mounted to a forward portion of floor assembly 120, distal to first and third vertical member 140 and 144, and proximal to a forward portion of floor assembly 120.

The upper frame assembly 130 includes a first horizontal member 132 and a second horizontal member 136. The first horizontal member 132 has a rearward end suitably mounted to an upper end of the first vertical member 140, and a forward end suitably mounted to an upper end of the second vertical member 142. The second horizontal member 136 has a rearward end suitably mounted to an upper end of the third vertical member 144, and a forward end suitably mounted to an upper end of the fourth vertical member 146.

A base 128 supports the floor assembly 120 in a vertically, elevated manner above the ground G. The base 128 may include a plurality of legs or other conventional and/or suitable means for imparting raised support to the floor assembly 120.

A stair or ramp structure 80 formed of a plurality of preformed steps constructed of wear-resistant plastic or composite material, wood, or other rigid material capable of being injection molded in units of one or more steps is provided. The stair structure 80 is positioned adjacent or proximal to the floor assembly 120, or is otherwise removably or permanently affixed to the floor assembly 120.

The hunting stand 100 may further comprise a seat assembly 90 mounted between vertical members 140, 142, 144, and 146, or otherwise mounted to any suitable combination thereof. One or more pads or cushions may be attached to the upper surfaces of the seat section, or may be otherwise simply placed thereatop.

Figure 2:
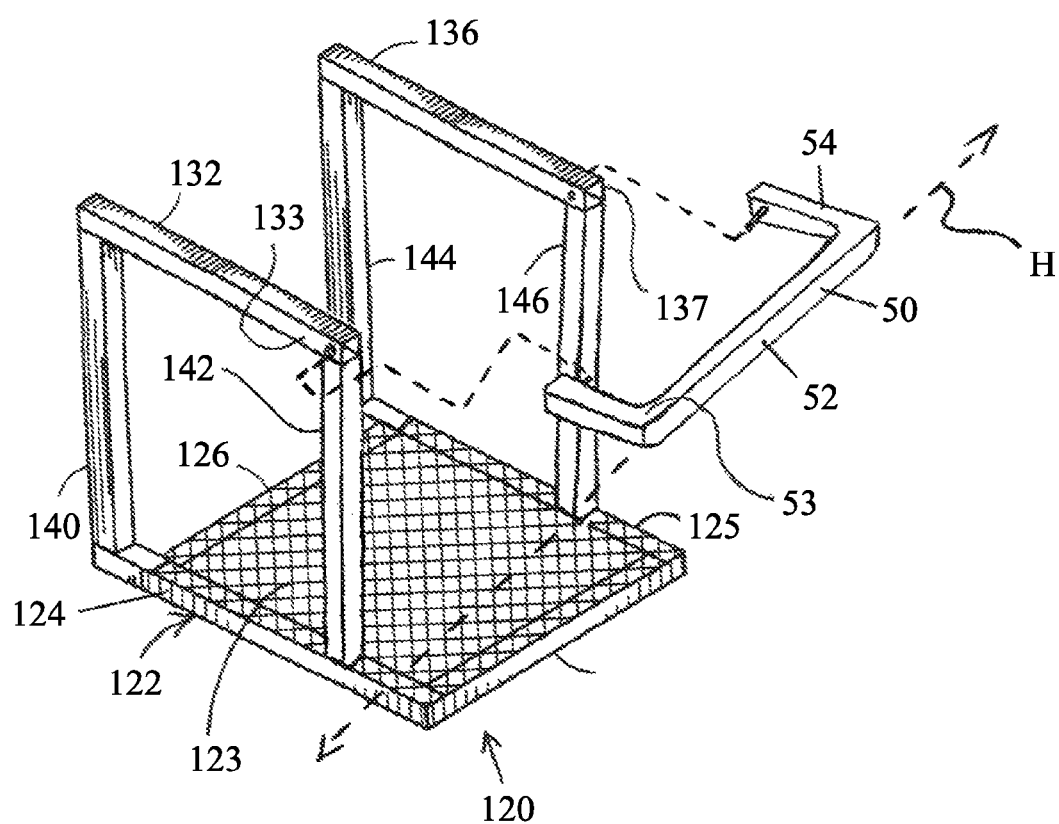
FIG. 2 is a partially exploded, perspective view of the upper frame assembly of a conventional hunting stand shown supported above the floor assembly via a plurality of vertical members.

In reference to FIGS. 1-4, and more particularly to FIG. 2, a shooting rail 50 is disclosed, wherein shooting rail 50 generally defines a C-shaped configuration comprising an elongated member 52 with opposed ends from which a pair of short members 53, 54 respectively extend integrally therefrom. The shooting rail 50 is pivotally mounted at an outer end of the first short member 53 thereof to the outer forward sidewall 133 of the first horizontal member 132, and pivotally mounted at an outer end of the second short member 54 thereof to the forward outer sidewall 137 of the second horizontal member 136. The shooting rail 50 may be defined as cylindrical, or a similar tubular configuration, and is constructed of a strong rigid material. The shooting rail 50 may also define a square-shaped cross-section, or other similar geometric tubular configuration, and is constructed of a strong rigid material. In any event, the selected configuration defining the shooting rail 50 is consistent with the configuration which defines a pair of support collars 70 and 74 (to be described later in greater detail).

Referring now more particularly to FIGS. 1, according to one embodiment, in order to facilitate controlled pivotal adjustment of the shooting rail 50 in a longitudinal plane about a horizontal axis, an adjustment mechanism 60 is disclosed. The adjustment mechanism 60 comprises an actuator 61 and a pair of support collars 70 and 74. The actuator 61 is pivotally secured between the shooting rail 50 and the second vertical member 142, or the fourth vertical member 146 (as shown in FIG. 3), via the pair of support collars 70 and 74, the support collars 70, 74 being in the form of cradles.

The actuator 61 comprises a trigger 62 comprising an elongated, slender rod 63 having a first end 64 opposing a second end 67. The first end 64 of rod 63 includes a fastener receiving sleeve 65 securably mounted perpendicularly, such as by arc welding, thereto, or molded integral thereto during the manufacturing process. The sleeve 65 includes a hole 66 defined axially therethrough for receiving a fastener 150, such as a bolt and cotter pin assembly 152. The second end 67 of rod 63 includes a hole 68 defined perpendicularly therethrough.

As illustrated more clearly in FIGS. 1-3, and 5-5C, the first support collar 70 comprises a generally U-shaped configuration and includes aligning apertures 71 and 72 defined through opposite faces 73 and 73a, respectively, thereof. In accordance to one embodiment, which may be preferably desired by right-handed operators of the present invention, the first support collar 70 embracingly engages the outer sidewall of second vertical member 142 and is securely mounted thereto via a fastener 154, such as a nut and bolt assembly 156 (as best shown in FIG. 1). More specifically, the first support collar 70 is embracingly engaged against second vertical member 142 such that the aligning apertures 71 and 72 are oriented forward of a frontal side of the second vertical member 142. The aligning apertures 71 and 72 of first support collar 70 allow fastener 154 to be received through the first aligning aperture 71 of collar 70, through the hole 68 defined through the second end 67 of rod 63, and through second aligning aperture 72 of collar 70, so as to firmly secure first support collar 70 to the second vertical member 142, and pivotally attach the second end 67 of actuator 61 (rod 63) to the first support collar 70.

The second support collar 74 comprises a generally U-shaped configuration and includes aligning apertures 75 and 76 defined through opposite faces 77 and 78, respectively, thereof. The second support collar 74 is slidably coupled in intimate engagement to the outer sidewall of the first short member 53 of shooting rail 50 via fastener 150. More specifically, the second support collar 74 is intimately engaged against first short member 53 such that the aligning apertures 75 and 76 are oriented below a lower side of first short member 53. The aligning apertures 75 and 76 defined through second support collar 74 allow the fastener 150 to be received through the first aligning aperture 75 of second collar 74, through the hole 66 defined through the sleeve 65 of rod 63, and through second aligning aperture 76 of second support collar 74, thereby slidably securing the second support collar 74 to the shooting rail 50, and pivotally attaching the first end 64 of actuator 61 (rod 63) to the second support collar 74.

In accordance to another embodiment, which may be preferably desired by left-handed operators of the present invention, the first support collar 70 embracingly engages the outer sidewall of fourth vertical member 146 and is securely mounted thereto via a fastener 154, such as a nut and bolt assembly 156. More specifically, the first support collar 70 is embracingly engaged against fourth vertical member 146 such that the aligning apertures 71 and 72 are oriented forward of a frontal side of the fourth vertical member 146 (as best shown in FIG. 3). The aligning apertures 71 and 72 of first support collar 70 allow fastener 154 to be received through the first aligning aperture 71 of collar 70, through the hole 68 defined through the second end 67 of rod 63, and through second aligning aperture 72 of collar 70, so as to firmly secure first support collar 70 to the fourth vertical member 142, and pivotally attach the second end 67 of actuator 61 (rod 63) to the first support collar 70.

In further accordance to the previously described embodiment which may be preferably desired by left-handed operators of the present invention, the second support collar 74 is slidably coupled in intimate engagement to the outer sidewall of the second short member 54 of shooting rail 50 via fastener 150 (as best shown in FIG. 3). More specifically, the second support collar 74 is intimately engaged against second short member 53 such that the aligning apertures 75 and 76 are oriented below a lower side of second short member 54. The aligning apertures 75 and 76 defined through second support collar 74 allow the fastener 150 to be received through the first aligning aperture 75 of second collar 74, through the hole 66 defined through the sleeve 65 of rod 63, and through second aligning aperture 76 of second support collar 74, thereby slidably securing the second support collar 74 to the shooting rail 50, and pivotally attaching the first end 64 of actuator 61 (rod 63) to the second support collar 74.

Thus, as previously described, the orientation of the elements and components of the present invention may be arranged in various configurations, and are not limited to the configurations as shown and described, and as such other configurations of applicant's elements and components are therefore within the spirit and scope of the present invention.

In particular reference to FIGS. 2 and 4, the adjustment mechanism 60 is adapted and configured to allow the shooting rail 50 to be pivotally adjustable about horizontal pivot axis X in a vertical plane (longitudinally with respect to a front end F of hunting stand 100 with shooting rail 50 oriented about a horizontal plane H).

Referring now more particularly to FIGS. 1-5A, and 5C, the adjustment mechanism 60 further comprises a precision adjuster 110 which allows the shooting rail 50 to be adjusted longitudinally (raised and lowered) in precise incremental vertical measures, in accordance to the operator's desired shooting rail 50 height. The precision adjuster 110 allows the shooting rail 50 to be longitudinally adjusted in substantially small incremental measures, wherein the shooting rail 50 may be longitudinally adjusted in increments each measuring approximately 0.125 centimeters (cm). The precision adjuster 110 shall be described later in greater detail.

In order to actuate vertical adjustment of shooting rail 50 by adjustment mechanism 60, the operator places his/her palm against a palm rest section 180 of the second or fourth vertical member 142 or 146, and the actuator 61 is pulled and released by operator, thereby causing the second support collar 74 to translate about the shooting rail 50 rearwardly and forwardly, respectively. More specifically, and in accordance to one exemplary embodiment, as the actuator 61 (trigger 62) is pulled, the second support collar 74 slidably engages the outer sidewall of the shooting rail 50 (more specifically, first or second short member 53, 54 of rail 50) rearwardly in a concurrently responsive manner causing the shooting rail 50 to be adjustably raised (with respect to height) in direct correspondence to the distance along which actuator 61 is pulled. Release of actuator 61 causes the second support collar 74 to slidably engage the outer sidewall of the shooting rail 50 (more specifically, first or second short member 53, 54 of rail 50) forwardly in a concurrently responsive manner causing the shooting rail 50 to be adjustably lowered (with respect to height) in direct correspondence to the distance along which actuator 61 is released.

The palm rest section 180 is defined as the area on the rearward outer side of the second or fourth vertical member 142 or 146, between the first support collar 70 and the shooting rail 50.

The adjustment mechanism 60 further provides the unique advantage of allowing the shooting rail 50 to be easily adjusted longitudinally by operator's free hand while concurrently maintaining engagement by operator's other hand on operator's weapon.

A locking means 160 is disclosed for releasably locking the shooting rail 50 at a selectively-desired vertical position. According to one embodiment, the locking means 160 comprises a handle 162 or knob 162a from which a threaded bolt 163, 163a extends downwardly therefrom, the threaded bolt 163, 162a threadedly engaging a threaded opening 164 defined through the outer sidewall of second support collar 74, wherein the threaded opening 164 of collar 74 being in direct communication with the outer sidewall of shooting rail 50. Turning of the handle 162 of locking means 160 in one direction causes a lower end of the threaded bolt 163 to engage the outer sidewall of shooting rail 50, and securely locks shooting rail 50 in such position. Turning of the handle 162 of locking means 160 in an opposite direction functions in the converse; the threaded bolt 163 is disengaged from contact with the outer sidewall of shooting rail 50 causing second support collar 74 to freely translate thereabout.

The shooting rail 50 is defined as being truly-responsive to the adjustment mechanism 60, wherein such responsiveness relationship coordinated there between is imparted by the precision adjuster 110, wherein precision adjuster 110 comprises a biasing means, such as a spring 170 or spring assembly, and a liner 114 or cover disposed on the inner surface 79 of at least one of the second support collar 74 and the outer surface of the shooting rail 50 or a portion thereof (see FIG. 3). The liner 114 or cover is constructed of an ultra-high molecular weight polyethylene polymer material, or similar material which allows the second support collar 74 to slidably translate about shooting rail 50 in a frictionless or friction-free manner. In accordance to one embodiment, the biasing device or spring 170 is suitably affixed between fastener 150 and the shooting rail 50, thereby providing a spring-biased precision adjuster 110.

Figure 6:
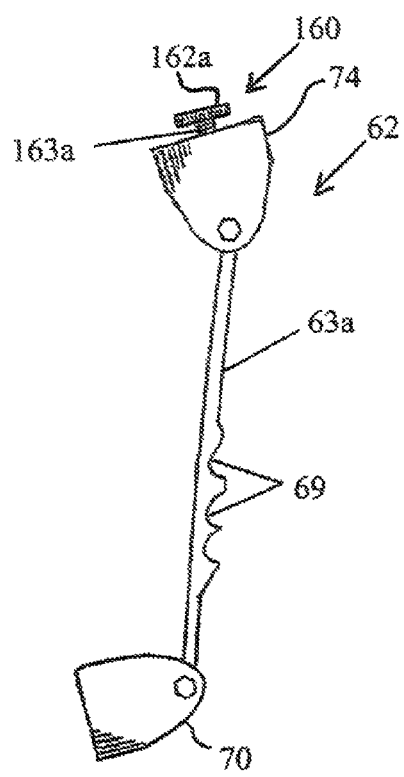
FIG. 6 is a side elevational view of an actuator with integral finger-gripping channels, in accordance to one embodiment of the present invention.

Referring now to FIG. 6, in accordance to one embodiment, the actuator 61 comprises an elongated body 63a which includes a plurality of finger-gripping channels 69 formed therein and ergonomically shaped to enhance operator's grip of the actuator 61.

Figure 7:
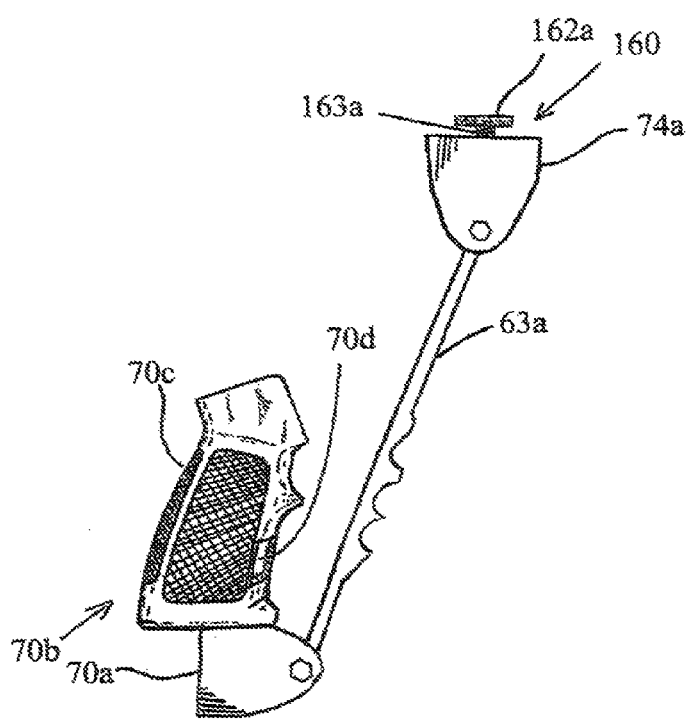
FIG. 7 is a side elevational view of an adjustment mechanism featuring a pistol grip design, in accordance to one embodiment of the present invention.

Referring now to FIG. 7, according to another embodiment, the first support collar 70a may further comprise a pistol grip design 70b, wherein collar 70a includes a pistol grip body 70c extending integrally upward from an upper surface edge of collar 70a. The pistol grip body 70c as envisioned generally defines an oval or C-shaped cross-section having an open interior space 70d for embracingly engaging the outer sidewall of second or fourth vertical member 142 or 146 in a snug-fit manner.

Finally, it is envisioned an improved hunting stand may be made commercially available as a kit, wherein said kit would comprise a conventional hunting stand 100 or hunting blind, the adjustable shooting rail device 10 of the present invention, and hardware, such as fasteners, bolts, couplings, O-rings, connectors, and brackets, and any other hardware utilized with and/or necessary for assembling a conventional hunting stand or hunting blind 100.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. An adjustable gun support apparatus shooting rail device comprising:
    an adjustment mechanism, the adjustment mechanism comprises:
    a shooting rail pivotally mounted to a hunting stand having two or more vertical members, a first horizontal member, and a second horizontal member;
    an actuator pivotally secured between the shooting rail and the first and second horizontal member of the hunting stand, or between the shooting rail and the two or more vertical members of the hunting stand; and
    a pair of support collars pivotally coupling the actuator between the shooting rail and the first and second horizontal member, or between the shooting rail and the two or more vertical members, wherein the pair of support collars comprises a first support collar and a second support collar, the first support collar is shaped in the form of a cradle, the first support collar is securely mounted to one of the two or more vertical members of the hunting stand, and wherein the second support collar is shaped in the form of a cradle, the second support collar is slidably coupled in intimate engagement to an outer sidewall of the shooting rail.

2. The adjustable gun support apparatus of claim 1, wherein the shooting rail comprises:
    an elongated member having a first end opposing a second end;
    a first short member integrally extending perpendicularly from the first end of the elongated member of the shooting rail; and
    a second short member integrally extending perpendicularly from the second end of the elongated member of the shooting rail.

3. The adjustable gun support apparatus of claim 1, wherein the actuator is manually manipulated to pivotally adjust the shooting rail in a vertical plane about a horizontal pivot axis.

4. The adjustable gun support apparatus of claim 3, wherein the actuator is manually manipulated to pivotally adjust the shooting rail to a selectively-desired vertical height position.

5. The adjustable gun support apparatus shooting rail device of claim 1, further comprising: a precision adjuster, the precision adjuster operative to vertically adjust the shooting rail in incremental measures, wherein each incremental measure measures approximately 0.125 cm.

6. The adjustable gun support apparatus shooting rail device of claim 1, further comprising: means for releasably locking the shooting rail of the hunting stand at a selectively-desired vertical position.

7. An adjustable gun support assembly, the gun support assembly comprising:
- a shooting rail; and
- an adjustment mechanism, the adjustment mechanism comprises:
  - an actuator pivotally secured between the shooting rail and an upper frame assembly of a hunting stand; and
  - a pair of support collars pivotally coupling the actuator between the shooting rail and the upper frame assembly.

8. An improved hunting stand or hunting blind apparatus, the apparatus comprising:
- a floor assembly;
- a plurality of vertical members;
- a plurality of horizontal members;
- a shooting rail;
- an adjustable shooting rail device; and
- hardware.

* * * * *